United States Patent
Demesmaeker et al.

(10) Patent No.: US 10,832,451 B2
(45) Date of Patent: Nov. 10, 2020

(54) MACHINE LEARNING IN ITERATIVE IMAGE RECONSTRUCTION

(71) Applicants: Siemens Healthcare GmbH, Erlangen (DE); Centre Hospitalier Universitaire Vaudois, Lausanne (CH)

(72) Inventors: Robin Demesmaeker, Morges (CH); Tobias Kober, Lausanne (CH); Davide Piccini, Prilly (CH); Jérôme Yerly, Charmey (CH)

(73) Assignees: SIEMENS HEALTHCARE GMBH, Erlangen (DE); CENTRE HOSPITALIER UNIVERSITAIRE VAUDOIS, Lausanne (CH)

(*) Notice: Subject to any disclaimer, the term of this patent is extended or adjusted under 35 U.S.C. 154(b) by 123 days.

(21) Appl. No.: 16/038,855

(22) Filed: Jul. 18, 2018

(65) Prior Publication Data

US 2020/0027251 A1 Jan. 23, 2020

(51) Int. Cl.
*G06K 9/00* (2006.01)
*G06T 11/00* (2006.01)
(Continued)

(52) U.S. Cl.
CPC ............ *G06T 11/006* (2013.01); *G06N 3/08* (2013.01); *G06T 7/0014* (2013.01);
(Continued)

(58) Field of Classification Search
CPC ............... G06N 3/08; G06T 11/006; G06T 2207/10081; G06T 2207/10088; G06T 2207/10104; G06T 2207/10108; G06T 2207/10116; G06T 2207/20081; G06T 7/0014
See application file for complete search history.

(56) References Cited

U.S. PATENT DOCUMENTS

| 2009/0262996 | A1 | 10/2009 | Samsonov et al. | |
| 2019/0251713 | A1* | 8/2019 | Chen | G06N 7/005 |
| 2019/0369191 | A1* | 12/2019 | Gong | G16H 30/40 |

OTHER PUBLICATIONS

Geyer, Lucas L., et al. "State of the art: iterative CT reconstruction techniques." Radiology 276.2 (2015): 339-357.
(Continued)

*Primary Examiner* — Tom Y Lu
(74) *Attorney, Agent, or Firm* — Lempia Summerfield Katz LLC

(57) ABSTRACT

In order to reduce the time and effort required to generate high-quality image reconstructions, a machine-trained neural network may assign a quality score to an image at each iteration of a reconstruction. The neural network may confirm that the iterative reconstruction process increases image quality as each iteration converges to the solution of an optimization problem. The image quality score generated by the neural network may drive the reconstruction toward better image quality by contributing to a regularization term of a cost function minimized by the optimization problem. The neural network may allow for multiple reconstruction of image data to be performed rapidly and for the highest image quality reconstruction to be identified. Additionally, the neural network may provide exit criteria of the iterative reconstruction or may contribute to the optimization problem.

16 Claims, 6 Drawing Sheets

(51) Int. Cl.
*G06T 7/00* (2017.01)
*G06N 3/08* (2006.01)

(52) U.S. Cl.
CPC ............... *G06T 2207/10081* (2013.01); *G06T 2207/10088* (2013.01); *G06T 2207/10104* (2013.01); *G06T 2207/10108* (2013.01); *G06T 2207/10116* (2013.01); *G06T 2207/20081* (2013.01)

(56) References Cited

OTHER PUBLICATIONS

John Heerfordt et al, "Automated Coil Ranking using a Neural Network for Image Quality Assessment—An Explorative Study in Coronary MRI." Scientific Session Contrast-Enhanced & Non-Contrast-Enhanced MR Angiography (2018): https://www.ismrm.org/18/program_files/O24.htm.

Lustig, Michael, David Donoho, and John M. Pauly. "Sparse MRI: The application of compressed sensing for rapid MR Imaging." Magnetic Resonance in Medicine: An Official Journal of the International Society for Magnetic Resonance in Medicine 58.6 (2007): 1182-1195.

Robin, Jerome, et al. "Deep Learning and Compressed Sensing: Automated Quality Assessment in Iterative Respiratory-Resolved Whole-Heart MRI." Electronic Poster SessionCardiovascular (2018): https://www.ismrm.org/18/program_files/EP18.htm.

\* cited by examiner

MACHINE LEARNING IN ITERATIVE IMAGE RECONSTRUCTION

FIELD

The present embodiments relate to image reconstruction using a neural network.

BACKGROUND

An image may be reconstructed from medical scan data generated, for example, by computed tomography, magnetic resonance imaging, x-ray imaging, ultrasound, or other imaging modalities. The quality of the reconstructed image may depend on one or more parameters of the reconstruction.

The reconstruction may be an iterative reconstruction. Successive reconstruction iterations may solve an optimization problem by minimizing a cost function having regularization and data fidelity terms. Suboptimal weighting of the regularization and data fidelity terms may cause the reconstructed image to be noisy, compressed, or blurry, thereby reducing image quality compared to more optimal weighting. Multiple images may be reconstructed according to different weights and presented to an operator, who may select an image with the highest perceived image quality.

For large datasets with image data relating to multiple acquisitions, the weights for the terms of the cost function resulting in a highest perceived image quality for a first image reconstruction may be applied to reconstructions of other images in the dataset to save time and labor. However, using the same weighting for other reconstructions (e.g., for a different organ, different level of image contrast, or other images) may result in suboptimal image quality. For example, the weights that were used for a high-quality reconstruction of image data of a liver may be used to reconstruct cardiac image data. Due to the differences between the topology of the liver and cardiac tissues, the weighting that produced the highest quality image of the liver may result in reconstruction of a cardiac image with reduced image quality due to noise or blur.

In a further example, a first regularization term of a cost function that was used for a highest quality reconstruction of image data of a heart during a first respiratory phase may be applied to reconstruction of images of the heart in other respiratory phases. Images reconstructed from image data acquired at different times or phases may have differing levels of image contrast. Applying a different regularization term (e.g., a second regularization term) for the second respiratory phase may be more appropriate and produce higher quality images of the heart than applying the first weighting. Multiple, differently-regularized reconstructions being performed for each respiratory phase and the operator selecting the image with the highest perceived image quality is costly and requires additional time and processing.

In another example, a first regularization term weighting (e.g., a first weighting) that was used for a highest quality reconstruction of image data acquired at first point along the T1 recovery curve may be applied to reconstruction of image data acquired at a second point along the T1 curve or at the same or a different point in time along the T2 recovery curve. Applying a different regularization term for the reconstruction of the image data acquired at a second point along the T1 curve or at the same or a different point in time along the T2 recovery curve may be more appropriate and produce higher quality images than applying the first regularization term. Multiple, differently-regularized reconstructions being performed for each point in time, recovery curve, or level of image contrast and the operator selecting the image with the highest perceived image quality is costly and requires additional time and processing.

SUMMARY

In order to reduce the time and effort required to generate high-quality image reconstructions, a machine-trained neural network may assign a quality score to an image at each iteration of a reconstruction. The quality score may be a visual quality, a diagnostic quality, or another quality of the image. The neural network may confirm that the iterative reconstruction process increases image quality as each iteration converges to the solution of an optimization problem. The neural network may allow for multiple reconstructions of image data to be performed rapidly and for the highest image quality reconstruction to be identified. Additionally, the neural network may provide exit criteria of the iterative reconstruction or may contribute to the optimization problem. The neural network may also provide a preview of a possible image quality after one or more further iterations of the reconstruction process are applied to an image.

In a first aspect, a method for reconstruction of image data includes acquiring medical image data and performing, by a processor, a first reconstruction iteration on the medical image data to produce a first medical image. The processor applies a machine-trained neural network to the first medical image to generate a first quality score of the first medical image. The neural network is trained on a plurality of images with a plurality of associated image quality scores. The processor outputs the first medical image.

In a second aspect, a method for training a neural network for assessment of image quality includes generating, by a processor, a plurality of example images from medical image data. The processor stores a plurality of image quality scores associated with each example image of the plurality of example images. The processor trains the neural network with machine learning based on the plurality of example images and the associated plurality of image quality scores.

In a third aspect, a system for reconstruction of image data includes an imaging device configured to acquire medical image data. An image reconstruction engine is configured to reconstruct a medical image based on the medical image data. A quality scorer is configured to apply a trained neutral network to the medical image to generate a quality score of the medical image. A display is configured to output the medical image

DETAILED DESCRIPTION OF THE DRAWINGS

Figure 1:
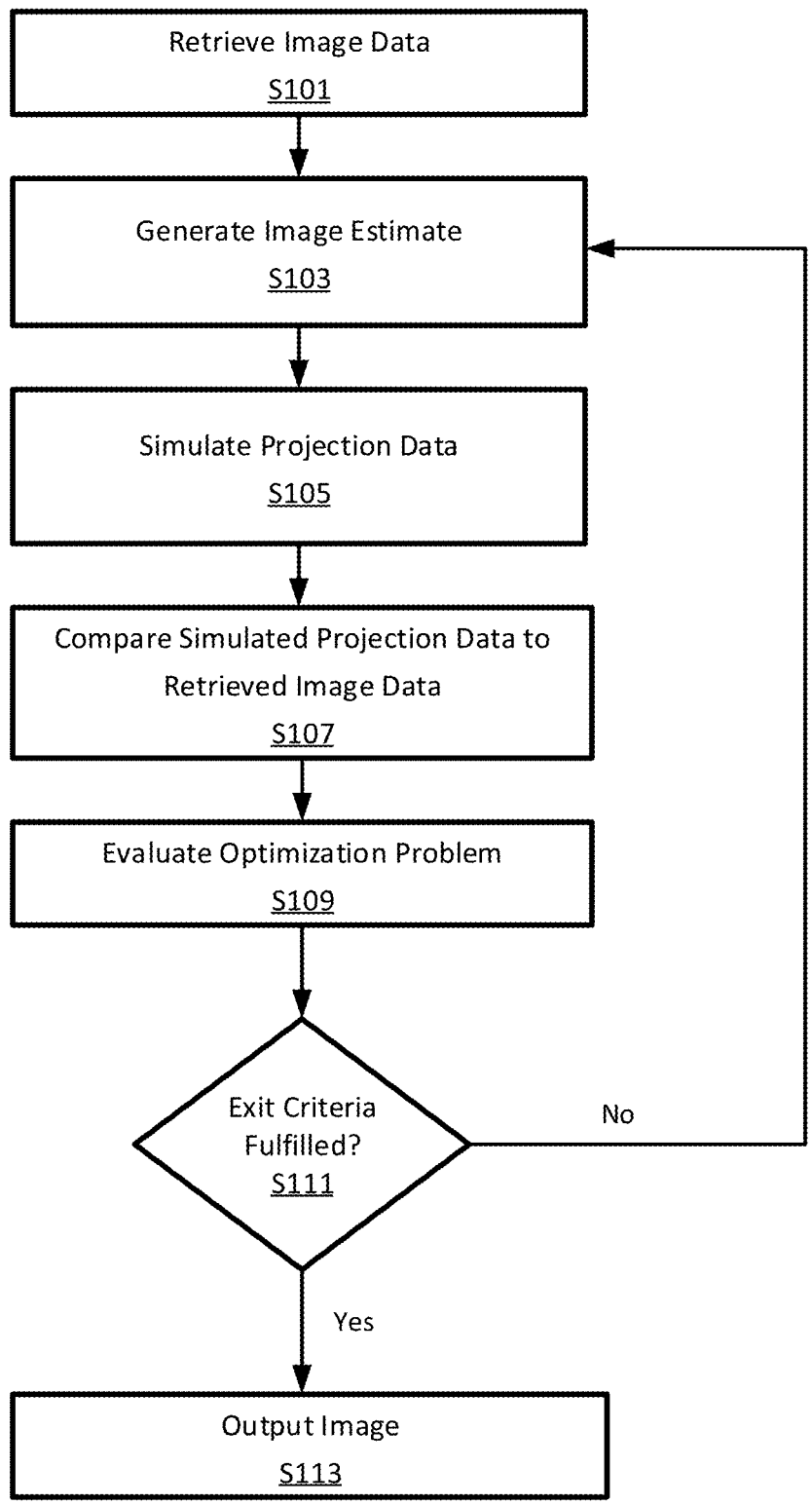
FIG. 1 shows a flowchart of an example of a method for reconstructing an image.

A machine-trained neural network may assign a visual image quality score to a reconstructed image to improve the quality of an iterative image reconstruction and reduce the time and effort needed to achieve high quality reconstructions. The neural network may be trained on a collection of images that have been scored on a quality scale by one or more expert operators. The trained neural network is able to automatically score an unseen image (e.g. an image not part of the collection of images used in the training).

The machine-trained neural network may be integrated with the reconstruction process in multiple ways. For example, the neural network may provide an automated image quality assessment to monitor the evolution of the quality of a reconstructed image at each iteration in the reconstruction process. By collecting and comparing the quality scores, convergence toward a solution to the optimization problem corresponding to an increase in image quality, as assessed by the neural network, may be confirmed. If convergence toward a solution of the optimization problem does not correspond to an increase in image quality, the reconstruction may be stopped before further computational resources are expended. The reconstruction may start over or proceed with different weights of terms in a cost function to be minimized by the optimization problem.

In another example, the neural network may be used to select the optimal weights of the cost function of the optimization problem. In some cases, multiple reconstructions of the same image data may be performed with a range of different combinations of values for the weights of the cost function. The reconstructed images may be scored for image quality by the neural network and the scores may be compared. The weights of the cost function that lead to the highest image quality may be chosen as the optimal weights for reconstructing the image data. Because the scoring may be performed automatically and as reconstructions are performed on different image data in parallel, the neural network may allow for rapid reconstruction of datasets of image data with optimal image quality without requiring intervention from the operator.

In a further example, the neural network may provide a stopping criterion for the reconstruction process. The neural network may score the reconstructed image at each iteration. If the image quality score is over a threshold value, or if the image quality score shows little improvement over the previous iteration or over more than the previous iteration (e.g., the past two or three iterations), the reconstruction may stop and output the reconstructed image at a current iteration. If the quality score keeps improving each iteration, or if the quality score is below a threshold quality score value, then the reconstruction may continue for at least another iteration.

In still another example, the neural network may provide a preview of the possible quality of a reconstructed image. The neural network may be trained on example reconstructions where each reconstructed image has both a final image quality and an initial or preliminary quality score (e.g., based on the image quality after the first one or more iterations, or an increase in image quality over the first one or more iteration steps). The neural network may compute the quality score for the reconstruction of unseen image data at each iteration. Using the quality score of the initial iterations of the reconstruction process, a preliminary quality score of the unseen image may be determined. The neural network may then use the preliminary quality score to provide a preview of the final image quality possible after one or more image reconstruction iterations are performed on the unseen image data.

In a still further example, the neural network may provide an assessment of image quality that may form part of a regularization term of a cost function of the optimization problem solved by the iterative reconstruction process. By using the quality score determined by the neural network as part of the regularization term or as the only regularization term, the minimization of the cost function drives the reconstruction toward enhancement of features in the image that increase the quality score. The gradient of the neural network may be calculated at each iteration and used in solving the optimization problem of the reconstruction.

FIG. 1 shows a flowchart of an example of a method for reconstructing an image. The reconstruction may be performed on image data generated by a CT scan, an MRI scan, an X-ray, a PET scan, a SPECT scan, or another imaging modality. The reconstruction may be performed online (e.g. at or close to the time of imaging) or offline (e.g. with stored data or not at the time of imaging).

In act S101, image data is retrieved. For example, the data may be retrieved from a medical imaging device or from a database. In some cases, the image data may include data from a single scan or multiple scans by a single or different imaging modalities. The image data may be the data as captured by the medical imaging device or may be altered. For example, the image data may represent a sub-sample of the image data as collected by a medical imaging device. In some cases, the image data may include multiple, different samplings of the image data as collected by the medical imaging device.

In act S103, an image estimate is generated. In some cases, the image estimate may be generated by back projection of the image data to the image estimate. For example, the image data may be in a k-space and the image data may be back projected into image space to generate an image estimate. In other cases, techniques such as non-uniform fast Fourier transforms may be used to generate the image estimate. Further processing of the image may be performed. For example, processing to reduce noise or increase contrast may be performed on the image estimate.

In act S105, projection data is simulated. The simulated projection data may be obtained by forward projecting the image estimate. For example, a beam may be simulated via forward projection to simulate projection data that would be generated by a receiver of the medical imaging device where the beam interacts with the object represented in the image estimate.

In act S107, the simulated projection data is compared to the retrieved image data. In some cases, the comparison will establish a discrepancy between the simulated projection data and the retrieved projection data. For example, the discrepancy may be on a per-pixel or per-voxel basis. Pixels or voxels in the simulated projection data may be compared to pixels or voxels at the same or similar location in the retrieved image data. The discrepancy may indicate a total number of different pixels or voxels, or a percentage of the different pixels or voxels relative to a total number of pixels or voxels. Additionally or alternatively, the discrepancy may measure differences in intensity at pixels in the simulated projection data compared to pixels or voxels in the retrieved image data. For example, large differences in intensity between pixels or voxels may be given a higher weighting in the calculation of the discrepancy than pixels or voxels with low differences in intensity. In some cases, the discrepancy may be caused by image processing performed to generate the image estimate.

In act S109, an optimization problem is evaluated for the image reconstruction. In some cases, the optimization problem may involve evaluating a cost function. For example, the optimization problem may require minimizing a cost function with at least two terms: a regularization term and a data fidelity term. The regularization term may incorporate the image processing done to the image estimate or properties of the image estimate such as noise reduction, contrast or clarity enhancement, sparsity, total variation, or other processes or properties. The data fidelity term may incorporate the discrepancy between the retrieved image data and the simulated projection data generated during the reconstruction iteration.

In act S111, exit criteria are evaluated to determine whether or not to perform another iteration of the reconstruction process. If the exit criteria are fulfilled, then the image may be output, as described in act S113. If the exit criteria are not fulfilled, another iteration of the reconstruction process is performed.

The exit criteria may comprise one or more measures. For example, the exit criteria may be a threshold for a value of the optimization problem, a minimum number of iterations, or other criteria. In another example, the exit criteria may be a threshold change in the value of the optimization problem. In one example, if the value of the optimization problem does not change over a threshold amount over one or more successive iterations of the reconstruction process, the image may be output. A large change in the value of the optimization problem may indicate that the image is being further refined at each iteration, whereas a small change in the value of the optimization problem may indicate that the image is not changing significantly at each iteration.

Where the one or more exit criteria are not met, the image reconstruction may start the next iteration at act S103. The image estimate may be generated with parameters updated based on the optimization problem. For example, noise reduction may be increased in the second reconstruction iteration. The second reconstruction iteration may update the image estimate according to a sign or direction indicated by a derivative of the cost function.

If the one or more exit criteria are fulfilled, the method proceeds to act S113. In act S113, the image is output. In some cases, the image may be output to a display. For example, the image may be output to a display at a terminal for use by an operator. In other cases, the image may be output to a database, server, or elsewhere for storage. The image may be stored for later retrieval by an operator or program. Additionally or alternatively, outputting the image may include outputting the quality score of the image.

An automatic assessment of visual image quality, such as the quality score provided by a machine-trained neural network, may be integrated into the image reconstruction process. For example, the neural network may be used to confirm that convergence to a solution of the optimization problem corresponds to an increase in image quality. By comparing the change in image quality and the value of the cost function at each iteration, the neural network may provide that the reduction in value of the cost function coincides with an increasing image quality. If the image quality declines while the reconstruction converges toward a solution to the optimization problem, then the reconstruction may be stopped. Reconstruction parameters may be adjusted to provide that the reconstruction process increases the image quality, or the reconstruction may be stopped at peak image quality if the image quality rises and then declines as more iterations are performed to solve the optimization problem.

In another example, the visual image quality of the image estimate may be automatically assessed as part of acts S103, S109, or S111. At the beginning of an image reconstruction iteration, the quality of the image may be scored when the image estimate is generated for the iteration. The image quality of the initial iterations may correlate with a final quality score after one or more reconstruction iterations. Where there is correlation between the initial quality score and the final quality score, the initial quality score may be used to estimate (or preview) the final image quality after further reconstruction iterations. This may allow for an estimate of how much the image quality will improve over the image reconstruction process.

In a further example, the quality score of the example image determined by the neural network may be used in the cost function of the optimization problem. For example, the image quality may form all or part of the regularization term in the cost function. Where the automated image quality score is used as the sole regularization term, the regularization may drive the reconstruction toward an enhancement of image properties that the neural network has identified as quality-defining features. Where the automated image quality score forms part of the regularization term with other terms, other regularization considerations are enhanced along with image quality. For example, a final image produced by the reconstruction may converge to both a measure of quality, as scored by the neural network, and an image smoothness criterion. The smoothness criterion may be that the image remains piece-wise constant. The contribution of the automated image quality score may be defined by a gradient of the neural network.

In still another example, the neural network forms all or part of the exit criteria evaluated in act S111. In some cases, the quality score of the estimated image is compared to a threshold. For example, when the neural network gives a quality score to the image estimate at or above a threshold value, the reconstruction may stop further iterations and output the image. If the quality score is below the threshold, one or more further reconstruction iterations may be performed to increase image quality. In some other cases, the change in the quality score over one or more previous iterations may form all or part of the exit criteria. For example, the change over the past two iterations may be compared to a threshold. Where the image quality of the estimated image has changed at or below a threshold value, then the image may be output. The value of the threshold may be set to curtail further reconstruction iterations that may use time and resources but generate a small change or improvement in image quality. Where the image quality of the estimated image has changed over the threshold amount, another reconstruction iteration may be performed.

Figure 2:
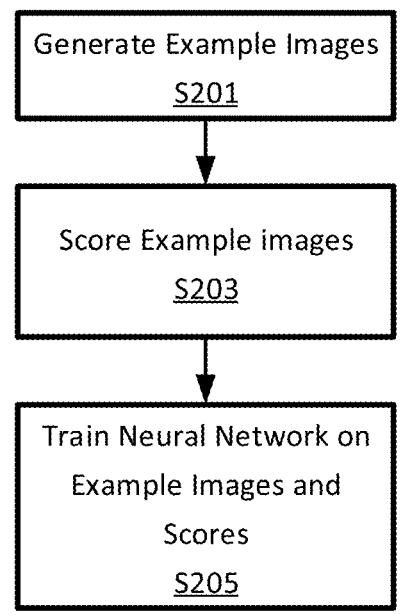
FIG. 2 shows a flowchart of an example method for training a neural network.

FIG. 2 shows a flowchart of an example method for training a neural network. The neural network may be trained by a machine using example images with associated image quality values. Once trained, the neural network is able to produce a quality score based on an input image that the neural network was not trained on.

In act S201, example images are generated. The example images may be reconstructed from image data. For example, generating the example images may include reconstructing the images from image data. The image data may be medical image data acquired by a medical imaging device. In some cases, the example images may be a collection of reconstructed images stored in a database. In some other cases, the example images may already be present in reconstructed form and do not require additional reconstruction. In other cases, each image includes a final image output from reconstruction as well as one or more preliminary or intermediate images from iterations of the reconstruction process.

The example images may be two-dimensional or three-dimensional representations of the image data. For example, the example images may be a series of two-dimensional slices or patches oriented in one or more orientations taken from a three-dimensional imaging volume represented by the image data.

The example images may have a greater number of dimensions. For example, the example images may contain three spatial dimensions in addition to dimensions of time, phase, image contrast, or flow.

In act S203, the example images are graded. The images may be graded by a human. In some cases, an expert operator or reader may assign each image a score value reflecting the visual quality of the image. For example, an operator may view the images and assign quality scores to each image at an imaging workstation. Each example image may be assigned a quality score having a value on a scale from 0.0 to 4.0, with 0.0 being the lowest quality and 4.0 being the highest quality. Additionally, other scales are possible. For example, a scale from 0 to 10 may be used. The scale may include integer or decimal score values.

In some cases, the expert operator or reader may grade the preliminary or intermediate images. For example, the operator or reader may assign an image quality score to one or more of the preliminary or intermediate images using the same image quality scale as the final image output from reconstruction. In this way, the improvement in image quality by the progression of reconstruction iterations may be assessed.

In act S205, the neural network is trained by a machine on the example images and associated image quality scores. A machine, such as an image processor, computer, server, or other device teaches the neural network to learn from the example images to output an image quality score. In some cases, the neural network is taught by the machine to learn from the example images and the initial or preliminary image quality scores to output a final image quality score.

The training is for imaging in any context or by any image modality. One neural network may be trained for any number of imaging situations. Alternatively, different neural networks may be trained for different imaging situations. The different situations include different scan modalities (e.g., different models for computed tomography, magnetic resonance, ultrasound, positron emission tomography, and single photon emission computed tomography), different types of tissue of interest (e.g., liver versus kidney), different diagnostic purpose or workflow (e.g., cancerous lesion versus bone calcification), and/or different users (e.g., different human or machine operators may have different preferences or specifications for visualization).

Once trained by the machine, the neural network may automatically score or grade the quality of an unseen input image. The input may not be part of the example images used in training but may have similar qualities. Because the neural network determines the quality score automatically, the quality score may be assessed at each iteration of image reconstruction, and for each image reconstructed in a set of image data, without human intervention.

The neural network may have one or more convolutional layers in communication with one or more fully connected layers capable of scoring patches of an image. For example, an input image to be scored by the neural network is broken into one or more patches that are each assigned an image quality score. An image quality score for the entire image may be determined based on a combination of the scores of the patches. For example, the image quality score for the entire input image may be an average of the quality scores for all of the patches of the image. Where the input image is a three-dimensional volume, the image may be broken into a series of two-dimensional slices that are further broken into patches. The image quality score for the three-dimensional volume may be the value of the average of the two-dimensional patches.

Figure 3:
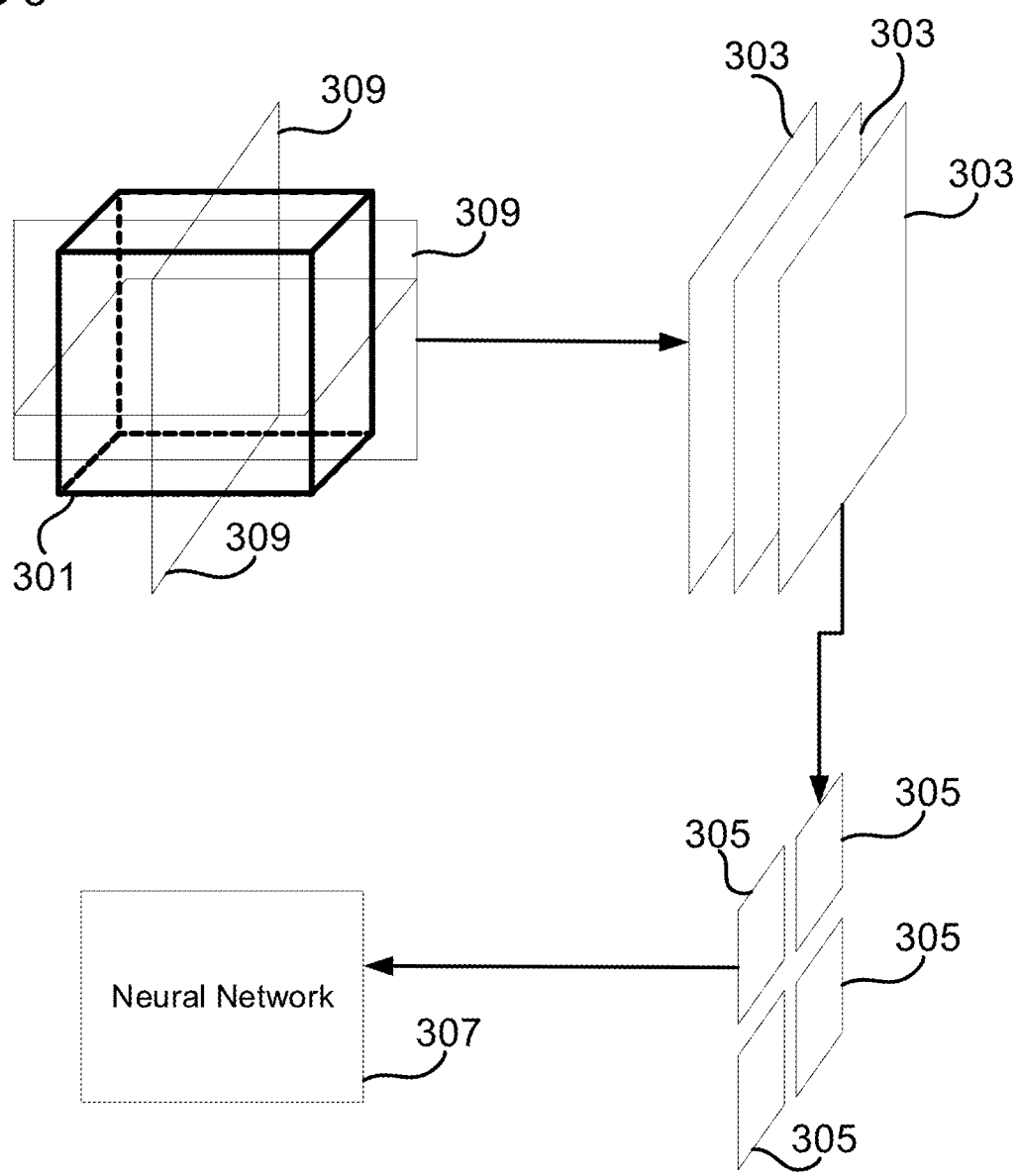
FIG. 3 shows an example of a technique for scoring image quality.

FIG. 3 shows an example of a technique for scoring image quality. Imaging data representing a three-dimensional volume may be divided into one or more slices 309. The slices 309 may be two-dimensional or three dimensional. The slices 309 may be oriented orthogonal to one another. For example, the slices may bisect the edges of a rectangular volume of imaging data.

The image data in the slices 309 may be reconstructed into one or more images 303. The reconstruction may be an iterative reconstruction. For example, the reconstruction may follow the method of FIG. 1. The images 303 may be the output images of the reconstruction or may be intermediate images generated during a reconstruction iteration (e.g., act S103).

The reconstructed images 303 may be split into one or more patches 305 in preparation for quality scoring. Alternatively, the quality scoring may be applied to the entire image 303. The patches 305 may be the same or different sizes.

The patches 305 may be input for quality scoring by a neural network 307. Alternatively, the neural network 307 may accept the whole images 303 as input for quality scoring. The neural network may be taught by a machine based on a collection of example training images and associated The neural network 307 may assign a quality score to each patch 305 of an image 303. A quality score for the entire image 303 may be determined from the patch 305 quality scores. For example, the image quality score for the image 303 may be an average or a weighted average of the patch 305 quality scores. Where the patches 305 are the same size, the average may be computed without weighting.

Figure 4:
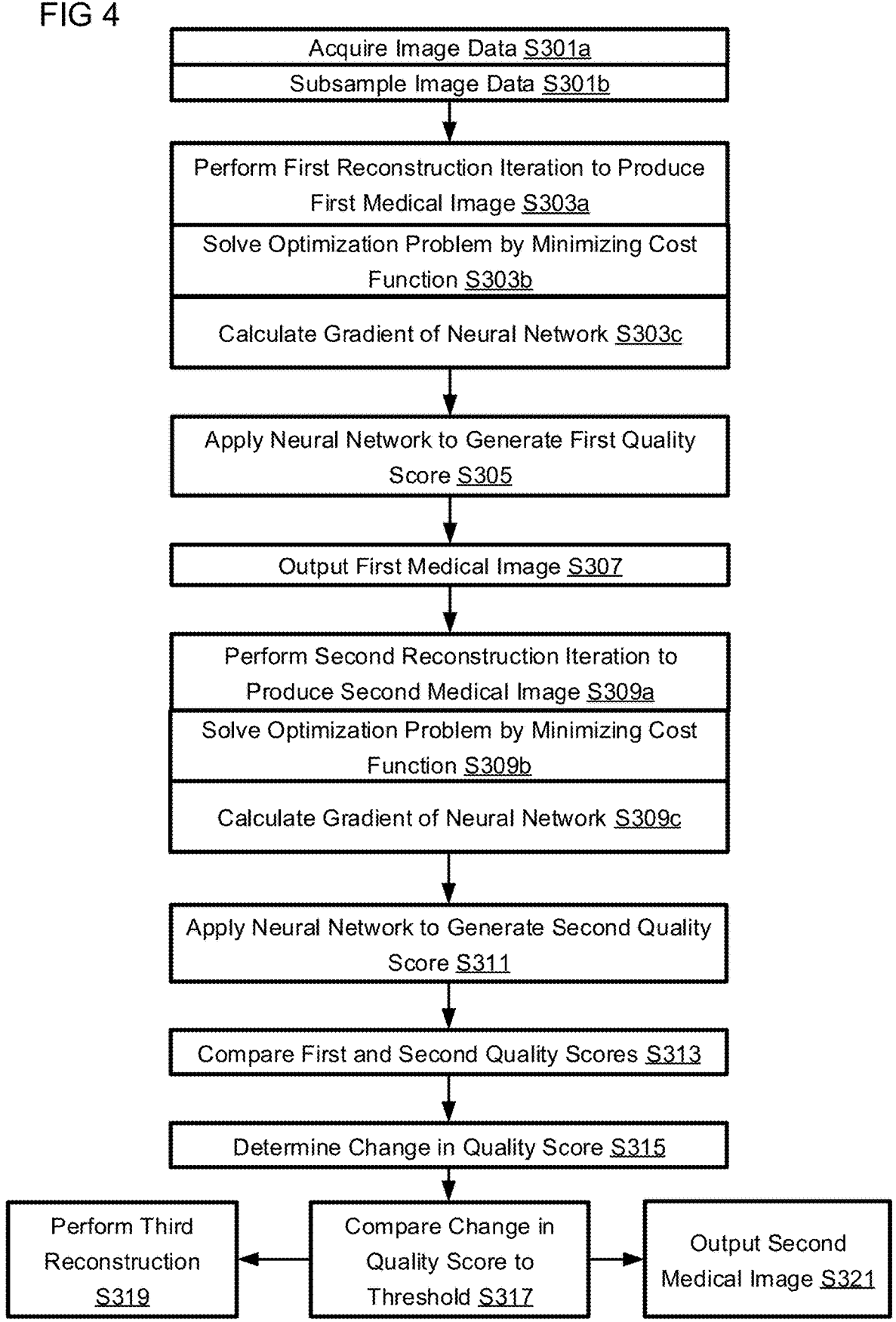
FIG. 4 shows an example of a method for iteratively reconstructing an image using a neural network for image quality scoring.

FIG. 4 shows an example of a method for iteratively reconstructing an image using a neural network for image quality scoring. The image may be reconstructed from image data. For example, the image may be reconstructed from medical image data. The image data may be CT scan data or scan data generated during rotation of a C-arm during X-ray imaging. Alternatively, the image data may be generated with another imaging device such as, for example, an MRI device.

The method may be performed by a computing device in communication with an imaging device or storage. For example, the method may be performed by a processor in communication with an imaging device. The imaging device may send the image data to the processor for reconstruction. The reconstruction may be performed as the image data is acquired (e.g. "online"). In another example, the method may be performed by a processor or computer in communication with an image data server. The processor may request the image data from the server, or the server may send the image data to the processor for reconstruction. The server may store image data from multiple imaging modalities and scans of different subjects and anatomies. The processor may perform the reconstruction from the image data at a different time than when the image data was acquired (e.g. "offline").

In act S301a, image data is acquired. In some cases, the image data may be acquired from an imaging device. In other cases, the image data is retrieved from a data store. For example, the image data may be retrieved from a server that stores the image data from an imaging device and provides the image data to the reconstruction process for retrieval.

In act S301b, the image data is subsampled. The image data may be sampled to generate subsampled image data. The sampling may be in any spatial, time, or other dimension. In some cases, the subsampling may be a two-dimensional subsampling of the image data. In other cases, the subsampling may be a temporal sampling of the image data. For example, the subsampling may be performed on a fixed area but incorporate image data taken at a regular time interval, such as a respiratory phase.

In act S303a, a first reconstruction iteration is performed on the image data to produce a first medical image. For example, the medical image may be produced by applying back projection to the image data to transform the image data from k-space to image space. The first reconstruction iteration may be an image reconstruction according to the reconstruction illustrated by FIG. 1.

Additional processing may be applied to the first medical image to improve the medical image. For example, noise reduction or contrast or clarity increasing processes may be applied to the medical image.

In act S303b, an optimization problem is solved by minimizing a cost function. The solution to the optimization problem is determined by the iterative reconstruction process. Because the optimization problem involves minimizing a cost function, the iterative solution converges to a solution that reduces the value of the cost function. Weighting applied to a regularization term and a data fidelity or data consistency term of the cost function determines the relative influence of the respective terms in the resultant image. The cost function may balance data fidelity and regularization in the reconstructed image. An example cost function may have the form of:

$$\underset{m}{\mathrm{argmin}} \|FCm - s\|_2^2 + \lambda \|\nabla_r m\|_1,$$

where F is a non-uniform Fourier Transform, C is a coil sensitivity map, m is the image to be reconstructed (e.g., a four-dimensional image), s is the radial k-space image data, $\lambda$ is a regularization factor, and $\nabla_r$ is a respiratory gradient operator. In this case, the cost function drives reconstruction of MR image data acquired during one or more particular respiratory phases. The cost function may be adapted to other imaging modalities or situations. For example, the coil sensitivity map may be omitted or replaced with a different weighting where x-ray data is used. In another example, the regularization term may include a measure or indication of image quality. The image quality may be assessed by the neural network. In some cases, the image quality indicator may be a quality score of the image at an iteration of the reconstruction process or a gradient of the neural network. Where the image quality indicator is the only regularization term, the reconstruction may be driven toward an enhancement of features in the image that result in an increase in visual quality of the image, as determined by the neural network. Other terms may contribute to regularization, such as total variation or sparsity of the image. When the automated assessment of image quality by the neural network is used with other terms in the regularization term of the cost function, the reconstruction may be driven toward an image that enhances image quality at the same time as features described or captured by the other regularization terms. For example, where a measure of piece-wise consistency is included, the solution that minimizes the cost function may converge to the concept of visual image quality, as determined by the neural network, but also remain piece-wise constant.

In act S303c, the gradient of the neural network is calculated. The gradient may be all or part of the regularization term in the cost function. The gradient may be calculated for each iteration. The gradient may be based on the image quality of the medical image.

In act S305, the neural network is applied to the image produced by the first reconstruction iteration to generate a first quality score. The neural network may be trained on a collection of example images and associated image quality scores. Based on the training, the neural network may output an image quality score of an unseen image such as the image produced by the first iteration of the reconstruction. The neural network may determine an image quality score of the image produced by each iteration of the reconstruction process.

In act S307, the first image is output. The output may send the medical image to a display for displaying the image. For example, the medical image may be output to a medical imaging workstation for viewing by an operator. In another example, the first medical image may be output to an image store. For example, where the image data was retrieved or acquired from an image data store or server, the reconstruction process may output the reconstructed image to the data store or server. Additionally or alternatively, outputting the first image may include outputting the quality score of the first image. The image quality score may be output to the display. In some cases, outputting the image may include transferring the image quality score to another device for storage. The image quality score may be sent to be stored on a server, workstation, or other device.

In some cases, the image is output where exit criteria are met. For example, where the first medical image has an image quality at or above a threshold, the image may be output. In another example, where the image quality has not improved over a threshold amount over a previous iteration, the image may be output. In a further example, the image is output after a minimum number of reconstruction iterations have been performed. The image may be output after 1, 10, or more iterations.

Where the exit criteria are not met, another image reconstruction iteration may be performed. Further image reconstruction iterations may improve quality or reach a more optimal solution to the cost function. The automated image quality assessment provided by the neural network may provide that a convergence to an optimal solution of the optimization problem corresponds to an increase in image quality. Where the convergence to a solution of the optimization problem results in a reduction in image quality, the reconstruction may be stopped. For example, the reconstruction may start over with different parameters, or the image with the highest quality generated from the current reconstruction process may be output.

In act S309a, a second reconstruction iteration may be performed. The second reconstruction iteration may use simulated image data generated from the first medical image of the first reconstruction iteration as an input. The second reconstruction iteration may use the same or different parameters as the first reconstruction. For example, more or fewer noise reduction techniques may be applied. The second reconstruction iteration produces a second medical image.

In act S309b, the optimization problem may be solved again by minimizing the value of the cost function. Successive iterations of the reconstruction process may move toward a more optimal solution of the optimization problem. As with the cost function minimized in act S303b, the cost function may include a regularization term and a data consistency or fidelity term that are weighted contributions to the cost value of the cost function. The regularization term may include a measure or indication of image quality. For example, the regularization term may include a gradient of the neural network, as calculated in act S303c.

In act S311, the neural network is applied to the second medical image to generate a second quality score. The second quality score may be scored using the same scale as the first quality score to aid in comparing the image quality values. For example, both the first and second image quality scores may be scored on a scale of 0.0 to 5.0. Other scales may be used.

In act S313, the first image quality score and the second image quality score are compared. Comparison between the first image quality score and the second image quality score may confirm that successive iterations have produced an increase in the quality of the reconstructed medical image.

In act S315, a change in the quality score is determined. The change in image quality may be determined by subtracting the first image quality score from the second image quality score.

In act S317, the change in quality score is compared to a threshold. The threshold may be set to a change in the quality value that is visually imperceptible. For example, the change in image quality may be set to a threshold amount of 0.1. The image quality threshold may be set based on a property of the image data. For example, the image quality threshold for image data of an anatomy with large or dispersed details may have a higher value than the image quality threshold for image data of an anatomy with smaller or more densely-packed features.

Where the change in the image quality scores meets or exceeds the threshold, a further image reconstruction is performed in act S319. A change in the quality score over iterations that is above the threshold may indicate that the quality of the image is continuing to improve. Further iterations of image reconstruction may refine and improve the quality of the reconstructed image.

Where the change in the image quality scores is below the threshold, the second medical image is output in act S321. A small change in the image quality score over reconstruction iterations may indicate that the reconstructed images are similar. Because further reconstruction iterations are unlikely to further improve the image quality significantly, the latest (e.g. the second) image may be output when the change in the quality score is below the threshold. Additionally or alternatively, the threshold may have a minimum number of iterations. For example, if the change in the quality score has been below the threshold for more than one iteration, the newest medical image may be output.

Figure 5:
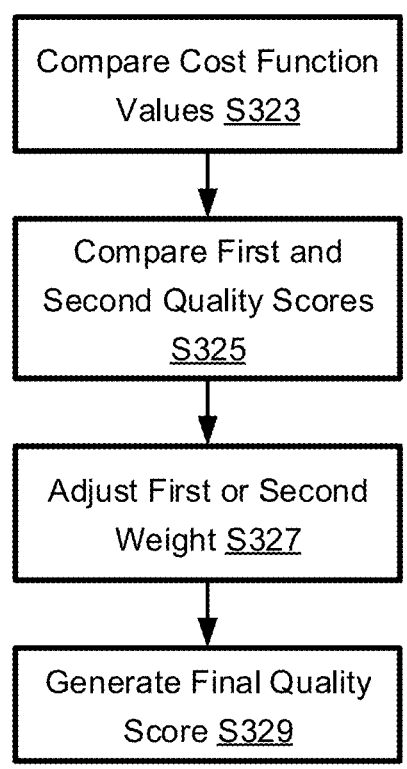
FIG. 5 shows a further example of a method for iteratively reconstructing an image using a neural network for image quality scoring.

FIG. 5 shows a further example of a method for iteratively reconstructing an image using a neural network for image quality scoring. The acts of FIG. 5 may continue from the acts of FIG. 4. For example, act S323 may proceed from act S321 of FIG. 4. Additionally or alternatively, act S323 may be performed in place of act S321.

In act S323, the value of the cost function from the first reconstruction is compared to the value of the cost function from the second iteration. If the reconstruction process is solving the optimization problem, the value of the cost function may decrease.

Where the cost value of the cost function is decreasing, but the image quality has reduced, the weighting of the regularization or data consistency terms of the cost function may be adjusted in act S327. For example, the weight of the regularization term may be increased where image quality forms part or all of the regularization term, and the weight of the data fidelity term in the cost function may be reduced. If another reconstruction is started using the adjusted weights of the regularization and data fidelity or consistency terms, respectively, the solution may increase image quality while converging to a solution minimizing the value of the cost function.

Additionally or alternatively, when the image quality decreases while the value of the cost function decreases, the reconstruction process may stop. In some cases, the reconstruction process will output the image generated in the penultimate reconstruction iteration (e.g. the iteration before the image quality decreased). Exiting the reconstruction process, rather than continuing with further reconstruction iterations that reduce image quality, may conserve computational resources.

The adjusted weights may be applied to the same image data in a separate reconstruction process. For example, the same image data may be reconstructed according to multiple different weights of the terms of the cost function. The quality scores determined by the network for each sibling reconstruction may be compared, and the reconstruction of the image data resulting in the highest image quality may be selected for output. In some cases, the weights of the highest quality sibling reconstruction may be applied to different sets of image data. For example, where the image data is a subset of a larger set of image data, the weights resulting in the highest image quality may be applied to the other subsample. In another example, the weights of the highest visual quality reconstruction may be applied to sets of image data taken at different times, according to different settings, or with different imaging modalities.

In act S329, the final quality score is generated. For example, the neural network may give an initial quality score to the first or second medical image. The final quality score may be determined or generated based on the initial quality score. In some cases, a correlation may be established between the initial quality score and the final quality score. The correlation may be based on the example images and grades of the example images. The correlation may be shown through an equation, relation, or formula linking initial quality to final quality. Additionally or alternatively, initial quality scores and final quality scores may be stored in a table or other structure. The final quality score may be determined by inputting the initial quality score to the formula or using the initial quality score to look up an entry in the table. The final quality score may represent a preview of a maximum achievable visual image quality after one or more further iterations are performed. The neural network may rely on a relationship between the initial quality of a reconstructed image and the final quality of the image to accurately predict or preview the final quality score of an unseen image not in the training set of images.

Figure 6:
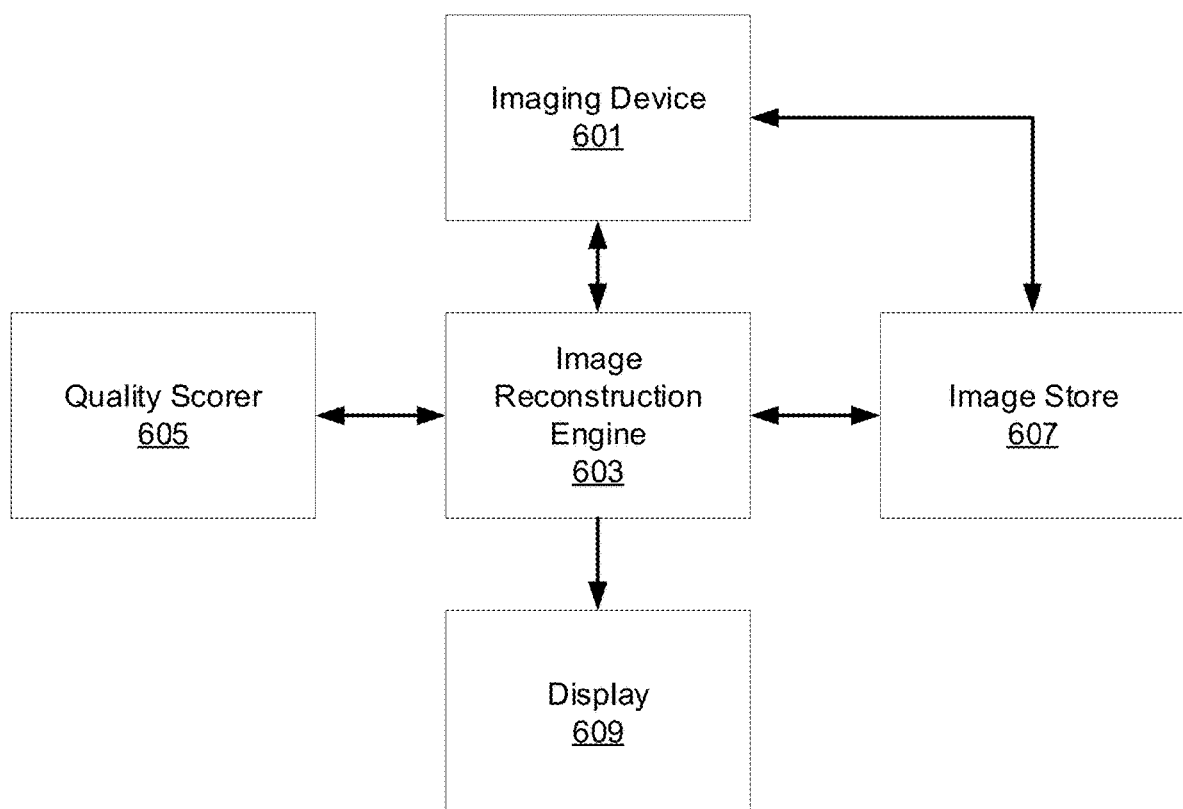
FIG. 6 shows an example system for iteratively reconstructing an image using a neural network for image quality scoring.

FIG. 6 shows an example system for iteratively reconstructing an image using a neural network for image quality scoring. The system may include an imaging device 601, an image reconstruction engine 603, a quality scorer 605, an image store 607, and a display 609. More or fewer elements may be provided. For example, the system may include an imaging device 601 without an image store 607. In some cases, one or more of the elements are provided by a memory attached to a processor. For example, the quality scorer 605 and the image reconstruction engine 603 may be implemented as instructions in memory to cause the processor to implement the quality scorer 605 and the image reconstruction engine 603.

The imaging device 601 may generate image data and provide the image data to the image reconstruction engine 603 or the image store 607. In some cases, the image reconstruction engine 603, the quality scorer 605, and the display 609 may be part of the imaging device 601. In other cases, the image reconstruction engine 603 and quality scorer are remote from the imaging device 601. For example, the imaging device 601 may be attached to the image reconstruction engine 603, the quality scorer 605, and the image store 607 by a wired or wireless network.

The imaging device 601 may perform medical imaging on a subject and provide the image data for reconstruction. The imaging device 601 may be a CT, an MRI, an X-ray, a PET, a SPECT, or another imaging device. The image reconstruction engine 603 may perform online reconstruction when the imaging device 601 provides the image data to the image reconstruction engine 603. The image reconstruction engine 603 may perform offline image reconstruction where the imaging device 601 provides the image data to the image store 607 and the image data is later requested by or provided to the image reconstruction engine 603.

The image reconstruction engine 603 may perform image reconstruction on image data. The image reconstruction engine 603 may include or be implemented by a general-purpose processor or application specific processor coupled with memory. For example, the image reconstruction engine 603 may be implemented by an imaging workstation. The image reconstruction engine 603 may have an interface for requesting and receiving image data from the imaging device 601 or the image store 607. For example, the image reconstruction engine 603 may communicate with the imaging device 601 or the image store 607 over a network connection. Image data or reconstructed images may be transferred to and from the image reconstruction engine 603 via the interface. Additionally or alternatively, the image reconstruction engine 603 may be integrated with the imaging device 601 or the imaging store 607.

The image reconstruction engine 603 may reconstruct image data provided by the imaging device 603 or by the image store 607. The image reconstruction engine 603 may be configured to perform image reconstruction according to the methods and techniques described in FIG. 1, 4, or 5. The image reconstruction engine 603 may provide reconstructed images to be stored in the image store 607 or to be displayed by the display 609.

The image reconstruction engine 603 may perform reconstruction using an automatic assessment of image quality provided by a neural network of the quality scorer 605. Reconstruction may be performed on multiple sets of image data from the data store 607 or the imaging device 601. For example, the image reconstruction engine 603 may select optimal settings (e.g. weights of regularization and data fidelity terms of a cost function) from a first reconstruction and use those settings for other reconstructions of other image data. In another example, the image reconstruction engine 603 performs multiple reconstructions of the same image data and chooses the image resulting from the multiple reconstructions with the highest image quality to be stored in the image store 607 or displayed on the display 609. In this way, the image reconstruction engine 603 may select optimal settings for reconstruction of image data based on the automated image quality assessment provided by the neural network of the quality scorer 605.

The quality scorer 605 may train and implement a neural network for scoring visual image quality. The quality scorer 605 may train the neural network according to FIG. 2. The neural network of the quality scorer 605 may score image quality according to FIGS. 3, 4, and 5. The quality scorer 605 may include or be implemented by a general-purpose processor or application specific processor coupled with memory. The quality scorer may include an interface for communication with other components. For example, the quality scorer 605 may receive images via the interface and return quality scores vis the interface. The quality scorer may be in communication with more than one image reconstruction engine 603. For example, the quality scorer may be in communication with two image reconstruction engines 603, allowing for multiple image reconstruction engines 603 to have quality scores assessed by the same quality scorer 605.

The neural network may provide an image quality score at one or more points in the image reconstruction process performed by the image reconstruction engine 603. For example, the quality scorer 605 may provide an image quality score calculated by the neural network at each iteration. The quality scorer 605 may calculate a gradient of the neural network for use in minimizing the cost of a cost function of an optimization problem solved by the image reconstruction engine 603.

The image store 607 may store image data and reconstructed images. For example, the image store may store image data from the imaging device 601. The image store 607 may include or be implemented by a general purpose or application specific processor coupled with memory. For example, the image store 607 may be implemented on a server in communication with the imaging device 601 and the image reconstruction engine 603. The image store 607 may include an interface for communicating with the imaging device. For example, the image store 607 may receive image data from the imaging device 601 and receive reconstructed images from the image reconstruction engine 603 via the interface. The image store 607 may be in communication with the other components via a wired or wireless network.

The display 609 may be a display configured to display the reconstructed images. For example, the display 609 may receive medical images from the image reconstruction engine 603 for display. In some cases, the display 609 is part of another component. For example, the display 609 may be part of the imaging device 601 or the image reconstruction engine 603. The display may be part of an imaging workstation of the imaging device 601. In some other cases, the display 609 is remote from one or more of the other components.

While reference has been made above to medical image data, the image data may be non-medical in nature. For example, the image data could be generated by an optical scanner and represent a 3-dimensional object such as a machine.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for reconstructing image data, the method comprising:
acquiring medical image data;
generating, by a processor, a first medical image, the generating of the first medical image comprising:
performing, by the processor, a first reconstruction iteration on at least a portion of the medical image data;
generating, by the processor, a first quality score of the first medical image, the generating of the first quality score comprising:
applying, by the processor, a machine-trained neural network to the first medical image, the neural network being trained on a plurality of images with a plurality of associated image quality scores;
outputting, by the processor, the first medical image or generating, by the processor, a second medical image based on the first quality score, wherein the generating of the second medical image comprises:
producing a second medical image, the producing of the second medical image comprising:
performing, by the processor, a second reconstruction iteration on the first medical image; and
generating a second quality score of the second medical image, the generating of the second quality score comprising:
applying, by the processor, the machine-trained neural network to the second medical image;
comparing, by the processor, the first quality score and the second quality score;
determining, by the processor, a change in the quality score based on the comparison of the first quality score and the second quality score;
comparing, by the processor, the change in the quality score to a threshold; and
performing, by the processor, a third reconstruction iteration when the change in the quality score exceeds the threshold.

2. The method of claim 1, further comprising:
outputting, by the processor, the second medical image when the change in the quality score does not exceed the threshold.

3. The method of claim 1, wherein performing the first iterative reconstruction further comprises:
solving, by the processor, a first optimization problem by minimizing a cost function, and
wherein performing the second iterative reconstruction further comprises:
solving, by the processor, a second optimization problem by minimizing the cost function.

4. The method of claim 3, wherein the cost function comprises a regularization term and a consistency term, the regularization term being weighted by a first weight and the consistency term being weighted by a second weight.

5. The method of claim 4, further comprising:
comparing, by the processor, a value of the cost function associated with the first reconstruction iteration to a value of the cost function associate with the second reconstruction iteration;
comparing, by the processor, the first quality score and the second quality score;
adjusting, by the processor, the first weight or the second weight when the value of the cost function associated with the second reconstructive iteration is lower than the value of the cost function associated with the first reconstruction iteration and the second quality score is lower than the first quality score.

6. The method of claim 4, wherein the regularization term comprises an image quality indicator generated by the machine-trained neural network.

7. The method of claim 6, wherein the medical image quality indicator is the first quality score, the second quality score, or a gradient of the machine-learned neural network.

8. The method of claim 3, wherein solving the first optimization problem further comprises:
calculating, by the processor, a gradient of the machine-learned neural network, and
wherein solving the second optimization problem further comprises:
calculating, by the processor, the gradient of the machine-learned neural network.

9. The method of claim 1, further comprising:
generating a final quality score of the first medical image based on the first quality score,
wherein the final quality score identifies a potential image quality after one or more reconstruction iterations are performed on the first medical image.

10. The method of claim 1, wherein acquiring the medical image data further comprises:
subsampling, by the processor, the medical image data to generate subsampled medical image data,
wherein the portion of the medical image data comprises the subsampled medical image data.

11. A system for reconstruction of image data, the system comprising:
an imaging device configured to acquire medical image data;
an image reconstruction engine configured to reconstruct a medical image based on the medical image data;
a quality scorer configured to apply a trained neutral network to the medical image to generate a quality score of the medical image; and
a display configured to output the medical image,
wherein the reconstruction of the medical image comprises determination of a value of an optimization problem having a cost function with a first weight for a regularization term and a second weight for a data fidelity term,
wherein the image reconstruction engine is further configured to perform a first reconstruction and a second reconstruction using different values for the first weight and second weight for the first reconstruction and the second reconstruction,
wherein the quality scorer is further configured to generate a first quality score for the first reconstruction and a second quality score for the second reconstruction, and
wherein the display is furthered configured to display a medical image produced by a reconstruction with a highest image quality of the first reconstruction with the first image quality and the second reconstruction with the second image quality.

12. The system of claim 11, wherein the image reconstruction engine is further configured to compare the quality score to a threshold and to perform a further reconstruction iteration when the quality score is below the threshold.

13. The system of claim 11, wherein the image reconstruction engine is further configured to perform at least a first second reconstruction iteration and a second reconstruction iteration on the medical image data, to calculate a value of an optimization problem for at least the first iteration and the second iteration, respectively, and wherein the quality scorer is configured to calculate a respective image quality score for at least the first iteration and the second iteration.

14. The system of claim 13, wherein the optimization problem further comprises a cost function with a regularization term and a data fidelity term, and wherein the quality scorer is configured to calculate a gradient of the neural network, the regularization term comprising the gradient of the neural network.

15. The system of claim 11, wherein the quality scorer is further configured to generate a preview of a final image quality score based on the quality score of the medical image.

16. A system for reconstruction of image data, the system comprising:

an imaging device configured to acquire medical image data;

an image reconstruction engine configured to reconstruct a first medical image based on the medical image data, a second medical image based on the first medical image, and a third medical image based on the second medical image;

a quality scorer configured to apply a trained neutral network to the first medical image to generate a first quality score of the first medical image and to the second medical image to generate a second quality score of the second medical image; and a display configured to output the first medical image, the second medical image, the third medical image, or a combination thereof, wherein the image reconstruction image is configured to compare the first quality score and the second quality score, determine a change in the quality score based on the comparison of the first quality score and the second quality score, compare the change in the quality score to a threshold, and reconstruct the third medical image when change in the quality score exceeds the threshold.

\* \* \* \* \*